United States Patent [19]
Stokes et al.

[11] Patent Number: 5,859,644
[45] Date of Patent: Jan. 12, 1999

[54] SYSTEM FOR PROVIDING SWITCHABLE COLOR PARADIGMS IN COMPUTERS

[75] Inventors: Michael Stokes, Cupertino; Alan D. Beck, Fremont, both of Calif.

[73] Assignee: Apple Computer, Inc., Cupertino, Calif.

[21] Appl. No.: 312,976

[22] Filed: Sep. 30, 1994

[51] Int. Cl.[6] .................................................. G06F 13/10
[52] U.S. Cl. ........................ 345/431; 345/333; 345/335
[58] Field of Search ................................... 395/131, 333, 395/335; 345/431, 333, 335

[56] References Cited

U.S. PATENT DOCUMENTS

| | | | |
|---|---|---|---|
| 5,249,263 | 9/1993 | Yanker | 395/131 |
| 5,254,978 | 10/1993 | Beretta | 345/150 |
| 5,311,212 | 5/1994 | Beretta | 345/150 |
| 5,416,890 | 5/1995 | Beretta | 395/131 |
| 5,459,824 | 10/1995 | Kashiwazaki | 395/131 |

OTHER PUBLICATIONS

Microsoft Corporation; Microsoft Windows for Workgroups, Version 3.11; 1985–1993.
Adobe Photoshop 3.0, User Guide, pp. 10–11, 116–117, 120–125, Jun. 1994.
"Adobe Macworld Photoshop Preview, Merger Continues", Newsbytes, Jul. 1994.
Robert Cowart, "Mastering Windows 3.1, Special Eddition", Sybex Inc., pp. 175–177, 209–212, 1993.

*Primary Examiner*—Mark K. Zimmerman
*Attorney, Agent, or Firm*—Burns, Doane, Swecker & Mathis, L.L.P.

[57] ABSTRACT

A computer is provided with sets of switchable resources and utilities that enable the user to select from among a number of color paradigms within which to work. These resources include different operating system support services, such as different color pickers that are respectively directed to the different paradigms. The utilities include some whose operations are integrated with application programs, and others which function on a stand-alone basis. A color personality agent requests the computer user to select a particular color paradigm with which to work. In response to the user's selection, the agent selects the appropriate resources and utilities for that paradigm, to provide full color management that is consistent with the user's designated preferences. All subsequent color-related operations are carried out in accordance with the selected paradigm, in a manner that is transparent to the user and application programs running on the computer.

7 Claims, 3 Drawing Sheets

SYSTEM FOR PROVIDING SWITCHABLE COLOR PARADIGMS IN COMPUTERS

The present invention is directed to the presentation of colors in computers, and more particularly to a system which enables users to switch between different color paradigms for controlling the selection and presentation of colors in a computer.

BACKGROUND OF THE INVENTION

The use of colors in computers to convey information, and otherwise present a pleasing user interface, is becoming more and more prevalent. Many application programs, as well as operating system software, are making increasing use of the color facilities available with computers for these purposes. Up until now, the techniques that have been employed to present color information to the user have been either specific to the application being run on the computer or hard coded into the computer's operating system. As a result, the user was required to understand how the software developer and/or computer engineer treated color, in order to fully appreciate the operation of the computer and the applications being run thereon.

For example, many programs are written to operate in a color space which employs red, green and blue (RGB) as the constituent colors, since most color monitors are based upon such a color space. To adjust colors in computers, a utility known as a color picker is often employed. The color picker might include a user interface which comprises three slider bars respectively associated with the three constituent colors. Colors are selected by adjusting the positions of the slider bars to vary the amount of each of the constituent colors in a selected color. When adjusting the colors, the user must understand how the constituent colors interact with one another to produce a particular effect. For instance, the user must know whether the colors are additive or subtractive in order to determine whether to increase or decrease the various constituent colors to achieve a desired result.

In many cases, the user does not always desire to operate in the color environment for which the computer and/or application program was designed. A fine artist, for example, primarily works with paint pigment colorants, which are upon the primary colors red, yellow and blue. Typically, the fine artist thinks about colors in terms of mixtures of pigments. Similarly, a graphic artist is most comfortable working with a color space based upon the colors cyan, magenta, yellow and black (CMYK) or with spot colors such as Pantones. Prepress operators and pressmen typically work with CMYK inks, and must take into account the interaction of ink, paper and press equipment when designing color graphics. Advertising artists, on the other hand, are most knowledgeable about watercolors or the like.

With conventional computers and application programs, each of these different types of users is forced into working in an unfamiliar color space, i.e. RGB. This is due to the fact that color spaces used for application programs are typically based on computational efficiency, rather than user preferences. It is desirable to avoid placing unnecessary constraints on the user, by providing a color experience that can be readily customized to fit a particular color industry.

In some types of computer systems, the user may be provided with an option that enables different types of color pickers to be selected. Thus, for example, when designing colors for a color palette, the user might be able to choose a color picker that operates in a CMYK color space, rather than RGB. Typically, however, this capability is only provided within the context of a specific application. If the user is working with more than one application at a time, he may be required to switch between different color paradigms as he goes from one application to the other.

Accordingly, it is desirable to provide the user with the ability to select a single color paradigm at the operating system level that pervades the entire operation of the computer, thereby permitting the user to work within a consistent paradigm that is most suited to that user's experiences and environment.

BRIEF STATEMENT OF THE INVENTION

In accordance with the present invention, a computer is provided with sets of switchable resources and utilities that enable the user to select from among a number of color paradigms within which to work. These resources include different operating system support services, such as different color pickers that are respectively directed to the different paradigms. The utilities include some whose operations are integrated with application programs, and others which function on a stand-alone basis. A color personality agent requests the computer user to select a particular color paradigm with which to work. In response to the user's selection, the agent selects the appropriate resources and utilities for that paradigm, to provide full color management that is consistent with the user's designated preferences. For example, if the user chooses an environment that is suited to fine artists, the selected color picker may present a simulated palette containing paint pigments. To obtain particular colors, the user mixes the pigments on the palette in a manner analogous to real-world operations. The utilities that are chosen are similarly consistent with the customs of fine artists and the rules that pertain to their particular use of colors.

Further features of the invention, as well as the advantages offered thereby, are explained in detail hereinafter with reference to particular embodiments of the invention illustrated in the accompanying drawings.

DETAILED DESCRIPTION

Generally speaking, the present invention provides a color management agent, which includes a set of switchable operating system resources, and integrated and independent utilities, to permit the user to customize the color environment provided by a computer. Using this agent, the user is able to choose a particular "color personality" for the computer, from among a number of available color personalities, and thereby control the display of colors produced by computer in a manner that is consistent with the user's preferences and knowledge base related to color. Once a particular personality has been selected, all color-related operations within the computer are performed in accordance with the selected paradigm. Thus, the user does not have to continually select new color resources each time a new application is launched, or the like.

Figure 1:
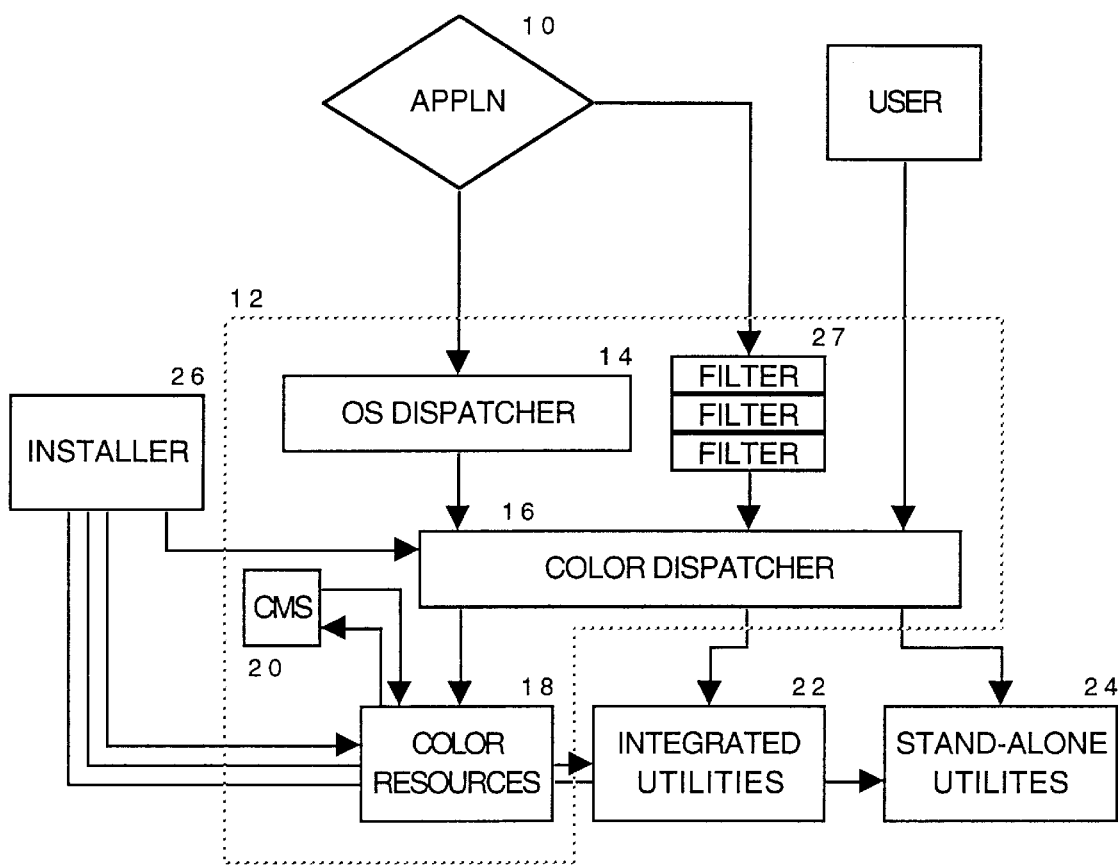
FIG. 1 is a block diagram of the software architecture of a computer system which incorporates the principles of the present invention.

Referring to FIG. 1, the software architecture of a computer system which implements the present invention is shown. Application programs 10 running on the computer make calls to the computer's operating system software 12 for access to system services. The operating system includes a dispatcher 14 which determines the nature of each call and forwards it on to the appropriate component(s) for handling that type of call. Calls related to color services, such as a call to adjust the background color of a display window, are forwarded to a color dispatcher 16.

The color dispatcher 16 functions as a color personality agent that combines various levels of functionality to provide a coherent user interface which presents the user with a color environment that is suited to the user's preferences and/or a color industry. A first level of functionality associated with this agent comprises operating system support services, or resources 18. One of these services is a set of color pickers. Included within this set is a plurality of color pickers which are respectively associated with different color paradigms. For example, a color picker for a fine artist might simulate a palette containing paint pigments. To obtain a particular color, the artist chooses and mixes the pigments in a manner analogous to actual paint mixing. Another color picker can be provided for graphic artists, and permit the artist to pick colors from a set of numbered spot colors, such as Pantone colors. Yet another color picker can be provided for prepress operators, which allows the user to pick colors based on CMYK colors.

Another operating system support service is a color management system 20. Such a system functions to convert color information into appropriate color space data for the consistent display of color images on different output devices of the computer. For example, color monitors typically operate in an RGB color space, and therefore most application programs issue color commands that are consistent with such a color space. However, most color printers operate in a CMYK color space, and therefore color commands from the application program are converted into this color space by the color management system 20 before being sent to the printer. An example of such a system is Color Sync™, developed by Apple Computer, Inc. Further information regarding the structure and operation of such a color management system is described in U.S. patent application Ser. No. 07/854,309 filed Mar. 19, 1992 and entitled Color Matching Apparatus and Method, the disclosure of which is hereby incorporated by reference.

A second level of functionality associated with the color dispatcher 16 comprises a variety of utilities 22 whose operations can be integrated with those of application programs. One such utility is a color checker, for example. This utility operates in a manner analogous to the operation of a grammar checker associated with word processing applications. It examines the color in each piece of a document and makes recommendations on the consistency and subjective appearance of color combinations, based on a predefined set of rules. For example, one set of rules may determine that certain colors for text are inappropriate in combination with specific background colors, such as yellow text on a white background. If such a combination is detected, the color checker can highlight the inappropriate colors and suggest one or more alternatives. The particular rules and combinations of colors that are employed will be determined by the specific paradigm within which the user is operating. Thus, an interior decorator might employ a different set of rules from a textile designer, even though they may both utilize the same type of color picker.

Another example of an integrated utility is a color formatter. In such a utility, various sets of colors can be established for a particular application. Once the user selects a particular set of colors, the color formatter guides the user through the objects in a document or the like, with suggestions for particular colors to be used on each object, such as text, highlighted items, etc.

The third level of functionality includes a set of stand-alone utilities 24 that are directly selectable by the user and independent of the operation of any application programs 10. These utilities pertain to functions associated with particular industries. An example of such a utility is a job evaluator for prepress operators. When called, this utility can lead the user through an examination of a job submission that is presented in an electronic form, to check for any missing elements, needed applications and image resolutions. If required, a form for tracking the job through the prepress operation can also be created.

Another example of a stand-alone utility 24 is a tutorial which instructs users about the selection and mixing of colors. For a beginning fine artist, for example, the tutorial can illustrate the effects of different brushes and simulate the various interactions that pigments will have with different types of canvases and other media.

To provide the user with the ability to select from among a number of different color personalities, multiple sets of utilities and resources are stored in the system and associated with the color dispatcher 16. More particularly, as described above, a different color picker can be provided for each different color paradigm. Similarly, various integrated utilities can be set up to correspond to the different paradigms, or a particular utility can be modified in accordance with the paradigm selected by the user. For instance, if a color checker is provided as one of the integrated utilities, the operative set of rules that it uses to check a document can be changed in accordance with the selected paradigm. Thus the rules that are employed for a graphic artist's environment can be different from those used by prepress operators.

Figure 2:
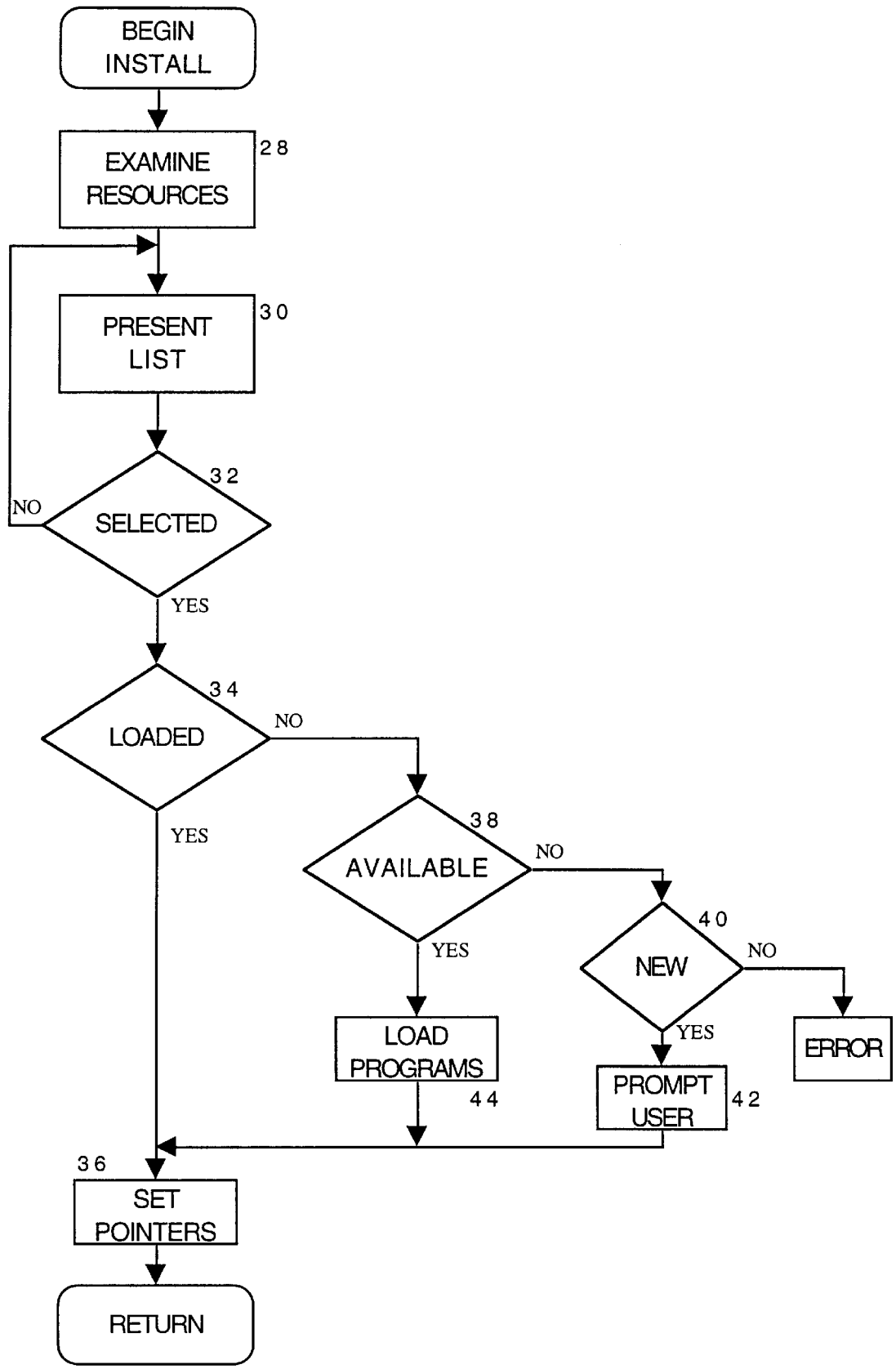
FIG. 2 is a flow chart of the operation of the installer utility.

An installer utility 26 enables the user to select the particular color paradigm that will be active during the operation of the computer. FIG. 2 is a flowchart of the operation of the installer utility in carrying out this function. Referring thereto, when the user invokes a command to select a color paradigm, for example as a preference item, the installer utility presents a list of the known or available paradigms. This list can be assembled by examining all of the resources 18 and utilities 22, 24 associated with color functions (Step 28). Each such resource and utility can include information which identifies the paradigm(s) with which it is associated. After determining the available paradigms, the list is presented to the user (Step 30), from which the desired one is selected.

Once the user has selected a particular paradigm from the list (Step 32), the installer determines whether the resources and utilities associated with that paradigm are already loaded in the computer's memory (Step 34). In this regard, multiple sets of color processing tools, that are associated with different paradigms, can be installed on the computer system and loaded into its memory at the same time. The installer enables the user to select one such set as the active one, pursuant to a desired color paradigm. If the necessary tools have already been loaded, the installer changes pointers in the color dispatcher 16 to point to the locations of those loaded programs (Step 36). If the programs have not been previously loaded, at Step 38 the installer determines whether the programs are available on the system. For example, when the user is presented with the list of paradigms at Step 30, he may also be given the opportunity to install new utilities. If this option is selected, the programs will not be currently available. In such a case, the installer checks at Step 40 whether the user has selected the new utilities option, and if so prompts the user to insert disks and otherwise take the actions necessary to install the new programs (Step 42). If the programs were already stored in the computer, they are loaded at Step 44, and the pointers in the color dispatcher are updated at Step 36.

Within a particular paradigm, the user can be presented with additional options. For example, there may be more than one color picker that can be used in a selected environment, such as one in which colors are presented on a palette, another which uses slider bars to change colors, and a third one which employs a three-dimensional geometric representation of constituent colors. In such a case, additional lists can be displayed to permit the user to select the particular color picker to be used with the selected color environment. In a similar manner, other choices might be presented to the user to select the set of rules to be used with a color checker, and the like. For a graphic or fine artist, the user can be presented with the ability to select particular sets of brushes or pens whose effects are to be used when colors are displayed, and to choose from different media that might react differently in the real world to inks or paints, e.g. newspaper or canvas.

Once a particular color paradigm has been selected by the user, all calls from the application program 10 that relate to color are routed by the operating system dispatcher to the color dispatcher 16. In this regard, it is to be noted that application programs need not be aware of the ability to select different color environments in order to interact with the color personality agent. Since all generic calls for color services are routed to the color dispatcher 16 by the operating system, the functionality of the color personality agent is transparent to the application program, and therefore no modification of the application programs is necessary. In particular, the application can still operate in the color space for which it was originally designed. If there is a need to change to a different color space for the selected paradigm, that change is carried out transparently by the color management service 20.

Furthermore, the operation of the color personality agent is transparent to the user. Once the user has selected a particular paradigm, all color operations are presented within that paradigm, and the user is not required to make any additional selections associated with color operations. Thus, the user can work with familiar tools, rather than having to learn to work with new ones.

Figure 3:
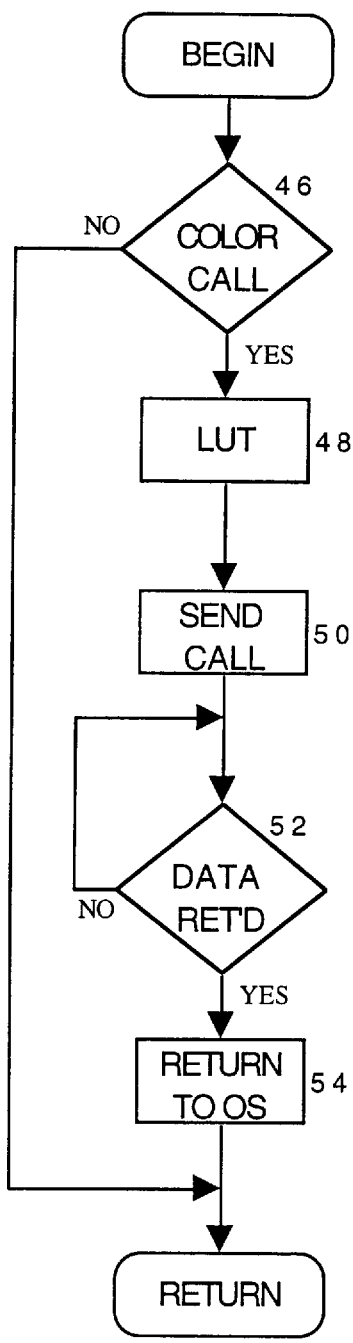
FIG. 3 is a flow chart of the operation of the color dispatcher.

FIG. 3 is a flowchart of the operation of the color dispatcher within the system depicted in FIG. 1, after a color paradigm has been selected by the user. The operating system 12 has a well-defined set of color calls that are known to the software developers who write application programs designed to work with that operating system. When an application program makes one of these calls to the operating system, the call is forwarded to the color dispatcher 16 by the dispatcher 14 within the operating system 12. In response, the color dispatcher redirects these calls to the appropriate sets of utilities in accordance with the pointers that were set by the installer 26.

Referring now to FIG. 3, when a call for the color picker is forwarded to the color dispatcher 16 (Step 46), the color dispatcher performs a look-up operation in a look-up table LUT (Step 48), and places a call to the color picker code stored at the location designated in the table (Step 50). These calls may use RGB data to designate the colors, for example, if that is the color space in which the application program was written. If the color picker does not employ the RGB color space, the color data is provided from the color picker to the color management system 20, where it is translated into the color space for the selected paradigm. The translated color data is then returned to the color picker, which then sends color values to the color dispatcher (Step 52). The color dispatcher forwards these values to the operating system (Step 54), to be displayed to the user. The same color as designated by the application program is displayed to the user, however it is now expressed in terms of the color space with which the user is more familiar, such as CMYK or Pantones, for example.

If the user decides to change the displayed color, a command is sent to the operating system from the application. Since this new color is expressed in terms of the color space associated with the selected paradigm, rather than the color space for the operating system, it must be retranslated. Therefore, the color picker sends the data to the color management service 20, where it is translated to RGB data, and then returned to the operating system to control the monitor display. Thus, from the user's standpoint, he is always working in the selected paradigm, e.g. paint pigments. Conversely, the application program and the operating system continue to work within the color space for which they were originally designed, such as RGB. All of the operations for translating between the various color spaces occur transparently to the user and to the application.

When calling upon the services of the integrated utilities 22, the application programs do not rely upon the operating system to direct the calls. Typically, these calls are made directly to the utilities themselves. In the context of the present invention, the calls to the utilities are handled by the color dispatcher, which forwards them to the correct utilities in accordance with the selected paradigm, pursuant to the pointers stored in the look-up table. The utilities are preferably generic in nature, in the sense that they are not designed for any particular application program. To enable them to work with specific applications, the operating system includes a set of application-specific filters or translators 27, which convert data and commands from the utilities into the required format and syntax for the specific application program that is running on the computer. These filters can be supplied by the developers of the application programs or by the developers of the utilities. The application programs communicate with the specific filters that were designed for them, and are therefore unaware of the fact that a generic utility associated with a particular paradigm is being run.

The stand-alone utilities 24 are application independent and directly called by the user. User requests for these utilities are also directed through the color dispatcher 16, however, to be sure that a utility that is appropriate for the selected paradigm is called upon.

From the foregoing, therefore, it can be seen that the present invention provides a color personality agent that enables the user to configure a computer to operate within a particular color paradigm with which that user is most comfortable. The available environments are readily switchable, so that different users can use the same computer and yet each have their own customized color experiences. Thus, a minimum amount of software can be loaded on the computer while still providing the user with a great deal of flexibility. Once a user has selected a desired paradigm, all further color-related actions are carried out within that paradigm. The user is relieved of the need to make additional, unneeded decisions regarding color operations. The conversion between the user-selected paradigm and the original paradigm for which the computer was designed takes place transparently with respect to both the user and to the application programs running on the computer.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A system for providing color processing services within a plurality of selectable color paradigms, comprising:

an installer utility via which a user selects a color paradigm from among a plurality of available color paradigms, and which is responsive to user selection of a color paradigm for loading color processing tools associated with the selected paradigm into working memory;

an operating system which receives calls from application programs for services to be performed, said operating system including a color dispatcher which receives calls that relate to color services and forwards said calls to appropriate ones of said color processing tools loaded into working memory; and a color management system which translates said calls into a color space associated with the selected paradigm and provides the translated calls to said color processing tools.

2. The system of claim 1 wherein said color processing tools return data to said operating system in the color space associated with the selected paradigm, and said color management system translates said data into a color space required by the operating system to perform a service.

3. The system of claim 1 wherein said color dispatcher also receives calls that relate to color services directly from users, independently of calls made by application programs.

4. The system of claim 1 wherein at least some of said color processing tools include utilities that are generic to a plurality of application programs, and said operating system includes a plurality of filters which convert data and commands from said utilities into formats appropriate for respective application programs.

5. A method for performing color-related services within one of several available color paradigms, comprising the steps of:

storing a plurality of sets of color processing tools which are respectively associated with different color paradigms;

selecting one of said color paradigms;

loading color processing tools associated with the selected paradigms into working memory, in response to said selecting step;

receiving requests for a color services from application programs;

forwarding the requests to appropriate ones of the color processing tools loaded into memory;

translating the forwarded requests into a color space associated with the selected paradigm; and processing the translated requests with said color processing tools.

6. The method of claim 5 further including the step of translating the results of processed requests into a color space associated with a function to be performed in response to said processing.

7. The method of claim 6 wherein said function is the display of a color on a monitor, and said results are translated into a color space associated with the monitor.

* * * * *